Jan. 12, 1926. 1,569,699
J. F. O. BERGSTRÖM ET AL
APPARATUS FOR RETAINING PARCELS OR THE LIKE ON VEHICLES
Filed June 14, 1923
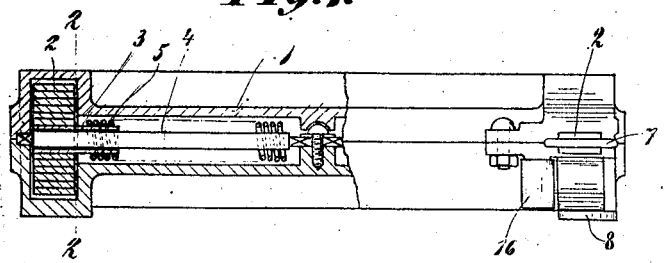
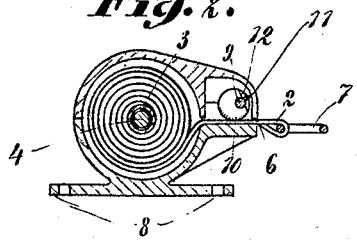
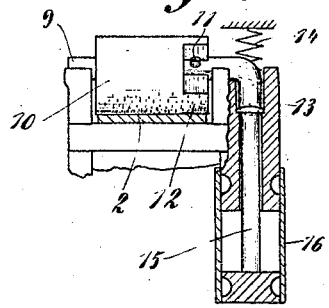
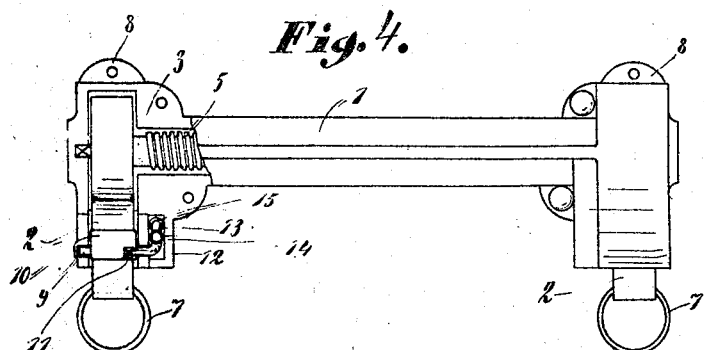

Patented Jan. 12, 1926.

1,569,699

UNITED STATES PATENT OFFICE.

JOHN FREDRIK OSSIAN BERGSTRÖM, OF ANGE, AND BROR JOHAN BRUNZELL, OF ARBRA, SWEDEN.

APPARATUS FOR RETAINING PARCELS OR THE LIKE ON VEHICLES.

Application filed June 14, 1923. Serial No. 645,326.

*To all whom it may concern:*

Be it known that we, JOHN FREDRIK OSSIAN BERGSTRÖM, a subject of the King of Sweden, and resident of Ange, in the Kingdom of Sweden, and BROR JOHAN BRUNZELL, a subject of the King of Sweden, and resident of Arbra, in the Kingdom of Sweden, have invented certain new and useful Improvements in Apparatus for Retaining Parcels or the like on Vehicles, of which the following is a specification, reference being had therein to the accompanying drawing.

This invention refers to an apparatus adapted to be fastened to skeleton sleighs, bicycles, automobiles or other vehicles and which comprises one or more straps, strings, ropes, cords or the like serving for retaining parcels and the like which have been put on the vehicle.

The accompanying drawing shows a suitable embodiment of the invention.

Figure 1 is a side view of the apparatus, partly in section.

Figure 2 is a cross section on the line 2—2 of Figure 1.

Figure 3 is a detailed view of a locking device for the strap.

Figure 4 is a plan view of the apparatus.

Figure 5 shows a modified detail.

1 is the case of the apparatus. The shape of the case is adjusted to the number of straps and the like to be mounted in the same. In the shown embodiment there are two straps 2, each of which is fixed at one end to a roller, sleeve, or the like 3 rotatably mounted on a shaft 4 stationary in the apparatus. Round the said shaft a spiral spring 5 is located, one end of which is fixed to the roller 3 and its other end attached to the shaft 4. The strap extends through an aperture 6 of the case and has on its free end a loop, hook or the like 7 of such a size as not to allow it to pass through the aperture 6 when the strap is left free to be pulled into the case by the spring and to be wound on the roller 3. The said loop, hook or the like 7 serves as a handle when the strap is to be drawn out, and also as a means for fastening the end of the strap to a suitable part of the vehicle when the strap has been laid on or round the article to be retained.

On a pin 9 rotatably mounted in the case 1 a locking or clamping roller 10 cooperating with the strap or the like is eccentrically mounted, teeth, furrows or the like being provided in the peripheral surface of the said roller. The pin 9 threaded through a hole of the roller 10 is provided with a lateral shoulder 11 entering a groove 12 of the roller, so that pin and roller may rotate relatively to one another within the limits determined by the extension of the groove 12 in the transverse direction of the roller. On the pin 9 there is provided an arm 13 extending approximately at a right angle to the pin and being acted upon by a comparatively weak spring 14. The arm 13 is intended to be actuated by a member in the shape of a displaceable plug 15 extending through a hole of the case. The portion of the plug 15 projecting outside the case is enclosed by a cap 16 of rubber or other suitable elastic material, the said cap preventing dust or dirt from penetrating into the hole made in the case for the plug 15.

When the strap is to be drawn out of the case, the plug 15 is pressed so as to act upon the arm 13 on the pin 9 whereby the latter is turned in the direction of the arrow and brings with it the locking or clamping roller 10 when the shoulder 11 abuts against the edge of the groove 12 so that the roller is brought out of engagement with the strap 2 on account of its eccentric position on the pin, after which the strap may be drawn out from the case without being hindered by the roller 10, and then it may be laid on or around the article to be retained. After the end of the strap provided with the loop 7 has been fastened to the vehicle the plug 15 is released so that it is brought back together with the pin into its initial position by the spring 14 and, with the cooperation of the elastic cap 16, after which the stretched spring 5 draws the strap tight round the parcel. The strap is then retained by the roller 10 cooperating with the strap and mounted eccentrically, the said roller preventing the strap from being drawn out from the case as for instance by the jolts of the vehicle or by great strains of the strap. The more the strap is strained the greater becomes the clamping action of the roller 10.

As shown in the drawing the case 1 is suitably made in two portions which are united mutually by screws or the like and one of which may be provided with lugs 8 by means of which the case is fastened to the vehicle by screws or in any other suitable manner.

If a rope, a cord or the like be substituted for the strap 2, a pair of discs are fixed on the roller 3, the cord or rope being wound on between the said discs which retain the cord in its fixed position on the cap when being wound up. Figure 5 shows as an example the roller 3 provided with two discs 17 which are entirely or partly arc-shaped, the distance between the two discs being greater at the roller 3 than at the circumference of the discs.

Having now described our invention, what we claim as new and desire to secure by Letters Patent is:

1. In a device for retaining parcels on vehicles, a casing, a roller mounted in the casing, a spring arranged to rotate the roller in one direction, a strap having one end attached to the roller and extending through an aperture in the casing, and a locking device for the strap embodying a shaft rotatably mounted in the casing, a clamping roller eccentrically mounted on said shaft for rotation thereby to and from clamping engagement with the strap, said shaft and roller arranged for limited movement independently of each other, and said shaft rotatable a distance independently of said roller before turning the roller to or from clamping position.

2. In a device for retaining parcels on vehicles, a casing, a spring actuated winding roller mounted in the casing, a strap fixed to and wound upon said roller with the free end extending through an aperture in the casing and a locking device for the strap embodying a shaft rotatably mounted in the casing, a clamping roller eccentrically mounted on said shaft for rotation thereby to and from clamping engagement with the strap, said shaft and roller arranged for limited movement relative to each other, an arm projecting at an angle from said shaft, and a sliding member cooperating with said arm when actuated to cause rotation of the shaft and clamping roller from clamping position, the said shaft rotated a distance independently of the roller before turning the same from clamping position.

In witness whereof, we have hereunto signed our names.

JOHN FREDRIK OSSIAN BERGSTRÖM.
BROR JOHAN BRUNZÉLL.